United States Patent Office 2,714,205
Patented July 26, 1955

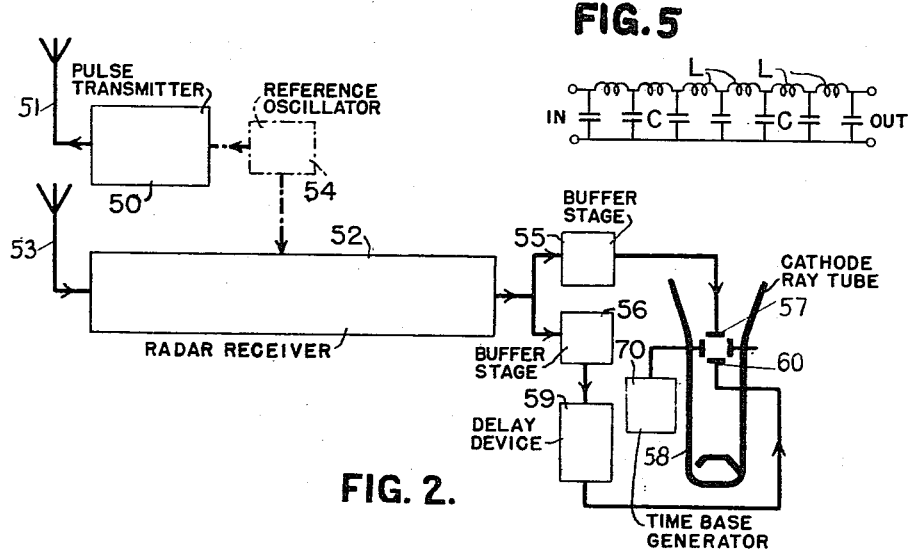
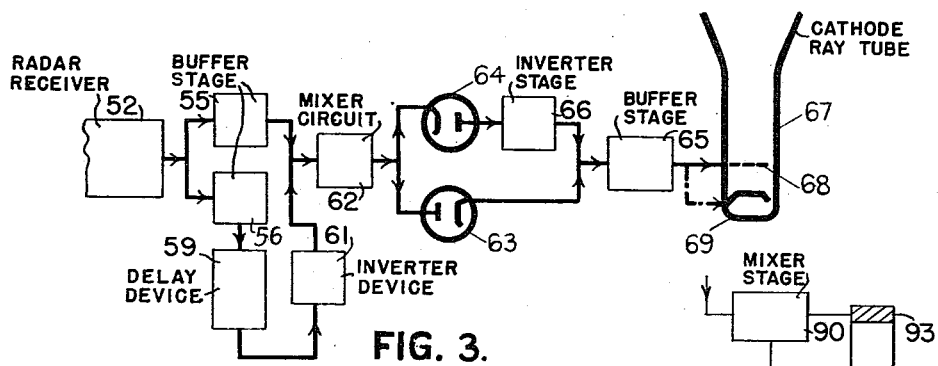
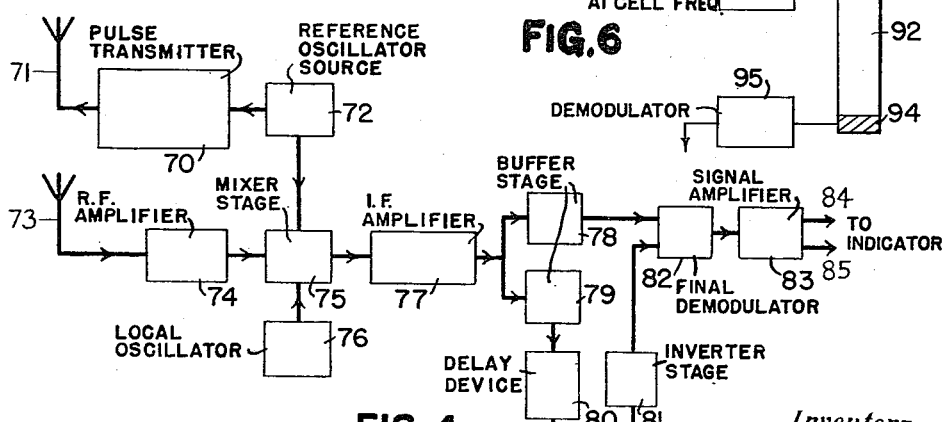

2,714,205

RADAR APPARATUS FOR DISTINGUISHING BETWEEN MOVING AND STATIONARY OBJECTS

Harry Grayson, Longsight, Manchester, Denis Edwin Brown, Chilton, near Didcot, and Geoffrey Cecil Barker, Allestree, England, assignors to the Minister of Supply in His Majesty's Government of the United Kingdom of Great Britain and Northern Ireland, London, England Application August 5, 1947, Serial No. 766,310
In Great Britain March 24, 1945

Section 1, Public Law 690, August 8, 1946
Patent expires March 24, 1965

14 Claims. (Cl. 343—7.7)

This invention relates to radio-location systems employing a pulsed radio-frequency exploring wave and in which echo pulses returned from a distant object, such as an aircraft are caused to operate a suitable receiving device to provide information as to the presence of and, preferably, the range and/or bearing of such object with respect to the receiving station. The invention also relates to apparatus for use in such systems.

As explained in greater detail in co-pending application of Harry Grayson and Denis Edwin Brown, entitled Radio Location Systems (an application corresponding to British application 5,065/45), filed in the United States Patent Office August 5, 1947, Serial No. 766,309, now U. S. Patent 2,586,028, issued February 19, 1952, equivalent of British patent specification No. 605,454, difficulty is frequently experienced in connection with systems of the above kind due to reception of echo pulses from fixed objects such as buildings, cliffs, mountains and other similar objects lying within the exploration field of the apparatus. The presence of such fixed object echoes or "clutter" frequently renders operation of the apparatus by normal methods an impossibility and to overcome this, it has been proposed to utilise the known "Doppler effect" by which the echo signal returned from any object which has a radial velocity with respect to the receiving point is changed in frequency from that of the original exploring wave. The present invention is more particularly, although not exclusively, concerned with radio-location systems and apparatus adapted to make use of such "Doppler effect."

With previously proposed arrangements utilising the aforesaid "Doppler" effect, the resolution of the "Doppler" beat has been effected by a process of filtration to provide either an audible or visual indication. In either case, the presentation of information as to tha range of the radially moving object introduces difficulty. In general, range information is not available unless means are provided for the selective examination in turn of small portions of each of several successive returned signals corresponding to a chosen range. While this examination is being effected, other objects at ranges different from that chosen may pass undetected.

One object of the present invention is to provide improved systems and arrangements for reducing or eliminating interference due to "clutter" signals while a further object of the invention is to provide improved systems and arrangements for utilizing the "Doppler" effect while permitting employment of normal methods of indication giving range information simultaneously on all responsive objects within the exploration field of the apparatus.

In a radio-location system employing a pulsed radio-frequency exploring wave according to one feature of the present invention, the signals received in response to one transmitted exploring pulse are compared in a subtractive or opposing sense with the signals received in response to a subsequently transmitted exploring pulse whereby partial or complete cancellation is effected of those components of the two received signals which are repetitive in character.

In a preferred arrangement a version of each received signal wave-form is subjected to a delay equal to the time period between successive transmitted exploring pulses and is then compared in a subtractive or opposing sense with a version of the signal waveform then being received in response to the next transmitted exploring pulse.

The comparison and cancellation may be effected either before, in or subsequent to the final demodulation stage of the receiver. Where effected before or in the final demodulation stage it is necessary, when a fixed timing value of the interval between successive pulses is employed, to render the transmitted pulses "coherent" in phase with one another in the matter described in co-pending application of Harry Grayson and Denis Edwin Brown, entitled Radio Location Systems (an application corresponding to British application 5,065/45), filed in the United States Patent Office August 5, 1947, Serial No. 766,309, equivalent of British patent specification No. 605,454.

The present invention, while adapted to operate upon any echo signal which exhibits a "Doppler beat," is particularly suitable for use with the systems and arrangements described in the aforesaid co-pending application wherein the received echo signals or signals derived from such echo signals are mixed with a suitable locally-generated reference oscillation which is phase-related to the oscillation of transmitted exploring pulses.

In order that the invention may be more readily understood a number of embodiments thereof will now be described by way of example with reference to the accompanying drawings, in which:

Figure 1 comprises a number of explanatory wave-form diagrams (a) to (r).

Figure 2 shows in block schematic form one arrangement of apparatus suitable for use in either "coherent" or "non-coherent" pulse operation and in which comparison and cancellation is effected after final demodulation.

Figure 3 is a block schematic diagram showing an alternative form of part of the arrangement of Figure 2, particularly adapted for use with cathode-ray tube display systems in which received signals are represented as intensity modulations of the tube beam.

Figure 4 shows in block schematic form one arrangement of apparatus employing "coherent pulse" operation in which comparison and cancellation of two received signal waveforms is effected before final demodulation.

Figures 5 and 6 illustrate in diagrammatic manner two suitable forms of delay device.

Figure 1:
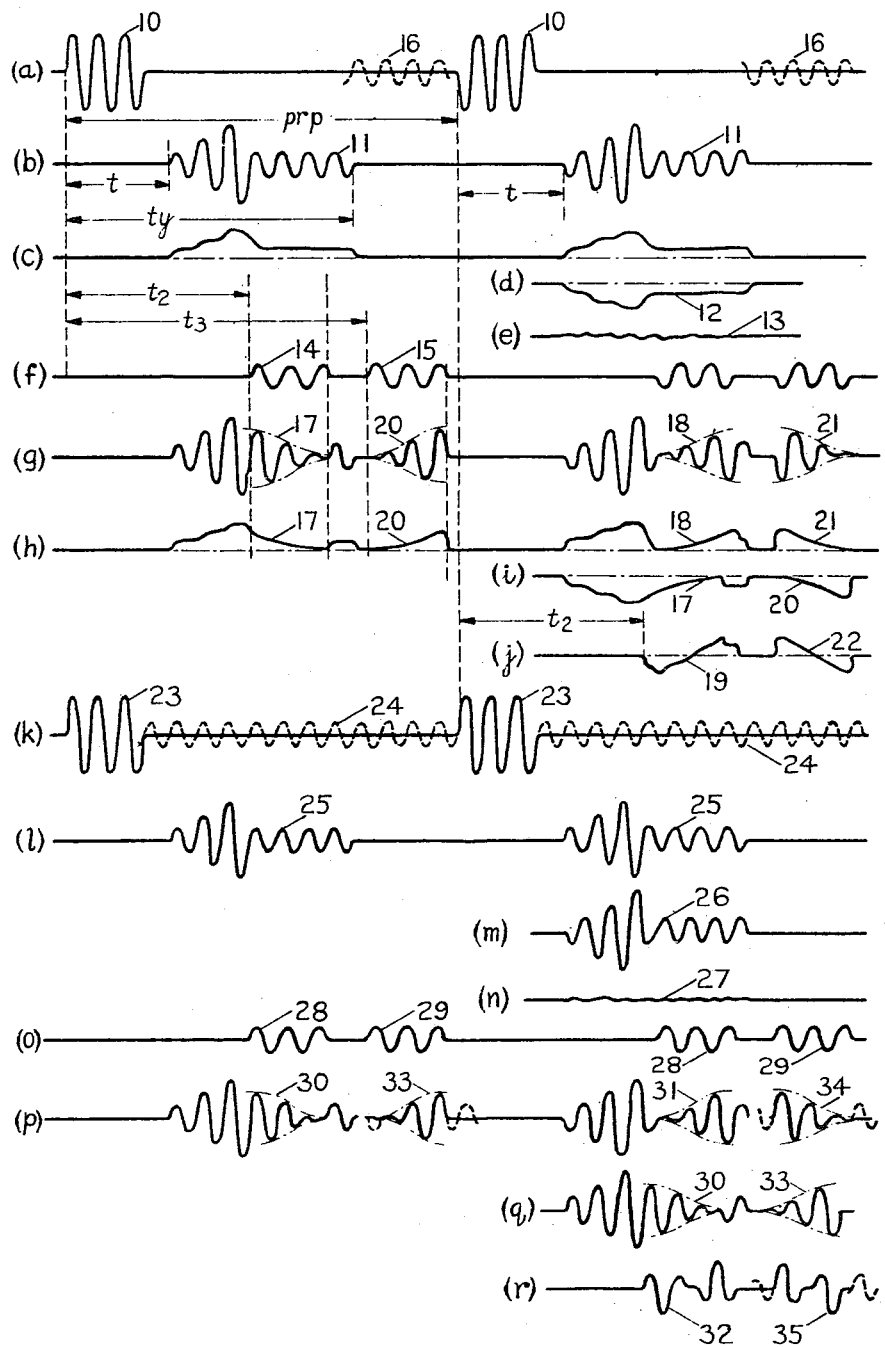

Referring first to Figure 1, diagram (a) illustrates in full line, the waveform of two successive pulses 10 emitted by a pulse transmitter of known type. It will be appreciated that this diagram as well as those of the further diagrams (b) to (r) are illustrative only and are not to scale. In practice there will be several hundred oscillations, at least, in each transmitted pulse, each pulse will be much more widely separated from its neighbours and there will be much greater differences of amplitude between transmitted and received pulses. In the diagrams, dimension prp represents the time interval between successive pulses, hereinafter referred to as the "pulse recurrence period" while dimensions $t$, $t2$, and $t3$ indicate different values of the time period between transmission of a pulse and the reception of an echo-signal related thereto, hereinafter referred to as "range."

Diagram (b) illustrates a typical waveform of echo signals 11 returned to a radio-location receiver from a composite object, such as a group of mountain peaks or buildings, located at fixed range from the receiver. Such echo-signals, while having an irregular modulation envelope varying widely in amplitude throughout the duration of the signal, are nevertheless substantially faithful copies of one another as regards such modulation envelope.

Each echo-signal 11 is shown as extending over a range distance between $t$ and $ty$ and it will be obvious that the existence of a further echo-signal from, say, an aircraft at any range between $t$ and $ty$, unless of very large amplitude compared with that of the signal 11 (an event which is unlikely), will cause such minor changes in the received echo-signal waveform that it will not be detected until it moves to a range clear of the fixed echo or "clutter" signal. Such interference with the operation of radio-location apparatus by fixed "clutter" echoes imposes a serious limitation upon their utility, particularly in mountainous country. The problem is complicated by the fact that radio-location apparatus must normally be capable of determining bearing as well as range and, in consequence of this requirement, the echo-signals received from a number of fixed objects within the exploration area of the apparatus will continually change in size, shape and position, as the apparatus is caused to search over its chosen area.

Fixed "clutter" signals, such as those shown at 11 can, however, be substantially eliminated by comparison, in a subtractive sense, of the echo-signal waveforms obtained from two different transmitted pulses, preferably two successive pulses. One manner of effecting this is illustrated diagrammatically in diagrams (c), (d) and (e). Diagram (c) illustrates the waveform obtained after rectification of the echo-signals 11 while diagram (d) shows the first echo-signal of diagram (c) brought into time-coincidence with the second echo-signal and suitably phase-inverted at 12. If these two signals are now mixed in a suitable circuit arrangement, the resultant output will be substantially zero as shown at 13 in diagram (e). The manner in which time-coincidence and phase-inversion may be effected will be described later. Such an arrangement will eliminate or substantially reduce all echo-signals which are repetitive in waveform from pulse to pulse.

Any object, such as an aircraft, which possesses a component of radial velocity with respect to the receiving point, will return echo signals which exhibit a change of frequency due to "Doppler" effect as already mentioned. Diagram (f) illustrates such frequency-changed signals from two different objects, one 14 lying at a range $t2$ within that covered by the "clutter" signal 11 of diagram (b) and the second 15 at a range $t3$ which is clear of such "clutter" signal.

By virtue of its presence simultaneously with the clutter signals 11 which are of unchanged frequency, each signal 14 will, on passage through a mixing or demodulating circuit, cause the formation of a "Doppler-beat" component within that portion of the corresponding clutter signal waveform 11 coincident in range. This results in an amplitude change as shown at 17 and 18 in diagram (g). The scale chosen for these diagrams makes it impossible to portray each wave with accurate phase.

The "Doppler" frequency-change value is dependent upon the radial-velocity component and in consequence the change of wave-form effected in each successive clutter echo-signal will, in almost all instances, be different. If two such modified signals are compared in subtractive sense in the manner already described, cancellation of the repetitive portions of the "clutter" signal will take place as before but those portions modified by the "Doppler-beat," being non-repetitive, will not cancel but will leave a resultant which can be used as an indication of the moving object located within the "clutter" area. This is shown in diagram (h), (i) and (j) where the comparison of the rectified signal due to the modified clutter echo 17 with the subsequent rectified signal due to the modified clutter echo 18 is seen to produce a resultant echo 19 coincident in range with the original moving object. In view of the removal of the remainder of the clutter echo, such moving object is now readily visible.

An echo signal such as that shown at 15 in diagram (f) from a moving object which is not coincident in range with a "clutter" signal, will suffer substantially complete elimination in most cases during the comparison and cancellation process in view of the similarity of their resultant rectified outputs. Such signals, however, may be used to derive a "Doppler-beat" component by mixing with a suitable reference oscillation such as that shown at 16 in diagram (a) and obtained in any of the ways described in the aforementioned co-pending application.

As previously described in connection with echo-signal 14, these signals 15 will now have a "Doppler-beat" modulation component which is, in almost all instances, not repetitive from pulse to pulse, and will, in consequence, provide a resultant output similar to the echo-signals 14, after the comparison and cancellation process. This is illustrated at 20 and 21 in diagrams (g), (h) and (i) with the resultant output 22 in diagram (j).

The output of diagram (j) may be applied in the usual manner to indicating means of any known type.

Although more conveniently effected after final demodulation as already described, the comparison and cancellation process may be effected before such demodulation, either at the frequency of transmission and reception or at an intermediate frequency. To effect this, however, it is necessary to employ exploring pulses which are "coherent" in phase with one another, i. e., each pulse train of oscillations forms a portion of a continuous oscillation at the frequency of transmission. A description of the manner in which such "coherent pulses" may be provided is given in said co-pending application.

Referring now to diagram (k) this illustrates in full line, the waveform of a pulse transmitter emitting a series of pulses 23 which are "coherent" in phase, by virtue of the fact that each pulse train of oscillations consists of an amplified part of a continuous oscillation shown by the dotted line 24.

Diagram (l) illustrates a waveform, similar to that of diagram (b), of echo signals 25 returned from a composite object at fixed range from the receiver. In this instance, in view of the coherence of phase between the pulses 23, the echo-signals themselves are likewise coherent in phase as well as being substantially faithful copies of one another as regards their modulation envelope as before.

Echo-signals such as these can be substantially eliminated by comparison, in a subtractive sense, of the echo-signal wave forms obtained from two different transmitted pulses, preferably two successive pulses. This is illustrated in diagram (m) where the first received echo-signal 25 is brought into time-coincidence with the second echo-signal and suitably phase-inverted at 26. If these signals are now mixed and demodulated in a suitable circuit arrangement, the resultant output will be substantially zero as shown at 27 in diagram (n).

The effects produced by the presence of an object, such as an aircraft, which possesses a component of radial velocity with respect to the receiving point, are substantially as already described with reference to diagrams (f) to (j). Diagram (o) illustrates in similar manner to diagram (f) the frequency-changed signals 28 and 29 received from two different objects, one 28 lying at a range $t2$ within that covered by the "clutter" signals 25 and the other 29 at a range $t3$ which is clear of the 'clutter" signal.

As already described in connection with diagram (g), the passage of the signals 25 and 28 through a suitable mixing or demodulating circuit will produce resultant signals as shown in diagram (p) which exhibits amplitude changes at 30 and 31 due to "Doppler-beating." If now, the resultant waveforms obtained in response to two different transmitted pulses, preferably two successive pulses, are compared in a subtractive sense, in similar manner to that already described in connection with diagrams (l), (m), (n), the repetitive "clutter" portions of the signals will be found to cancel as before but those portions such as 30 and 31 modified by the "Doppler-beat," being non-repetitive will not cancel but will leave a resultant as shown at 32 in diagram (r) which can be used as an indication of the moving object located within the "clutter" area.

Echo signals such as those shown at 29 in diagram (o) which are not coincident in range with a "clutter" echo will, as previously described, suffer substantially complete elimination during the comparison and cancellation process unless they are caused to exhibit a "Doppler-beat" component in some way. In this instance the continuous oscillation 24 of diagram (k) by which the requisite "coherent" exploring pulses are derived, provides a convenient "reference" oscillation for use in the manner more fully described in the aforementioned co-pending application whereby "Doppler-beat" modulation is produced as shown at 33 and 34 in diagram (p). Subsequent mixing and demodulation in the manner already described with reference to diagrams (l), (m) and (n) will produce a resultant 35, diagram (r), similar to that at 32.

Figure 2 illustrates in block schematic form one arrangement employing post-demodulation comparison and cancellation. In this figure 50 denotes a pulse transmitter supplying an aerial 51 while 52 denotes a radio-location receiver circuit supplied by aerial 53. The development of the "Doppler-beat" component in echo-signals from radially moving objects may be effected either by the "clutter-beat" method above referred to or by any of the methods described in co-pending application of Harry Grayson and Denis Edwin Brown, entitled Radio Location Systems (an application corresponding to British application 5,065/45), filed in the United States Patent Office August 5, 1947, Serial No. 766,309, equivalent of British patent specification No. 605,454, e. g. by the use of reference oscillator 54 which serves as a phase-locking medium for the transmitted pulses and also supplies a reference oscillation to the mixer stage of the receiver 52. The phase locking is effected, as described in British Patent No. 605,454, by injection of the reference oscillation from the oscillator 54 into the oscillatory circuit of the pulse transmitter, so that on pulsing the oscillation buildup in the circuit follows the waveform of the injected oscillation rather than occurring with a completely random phase as would otherwise be the case.

The demodulated output from receiver 52 is fed to two buffer stages 55 and 56, the former supplying its output directly to one vertical deflector plate 57 of the cathode-ray tube 58 and the other being connected by way of delay device 59 to the opposite vertical deflecting plate 60 of the C. R. T.

The delay device 59 is arranged to impose a delay equal to the pulse recurrence period in the signals supplied by buffer stage 56 with the result that the cathode-ray tube beam moving, for example, along a horizontal time-base scan, by the application of suitable deflecting voltages from a time-base waveform generator 70 to the opposed horizontal deflecting plates of the tube 58 in timed relation with the transmitted pulses, will be subjected to the output waveform originating from two successive pulses and in opposed or subtractive sense thereby providing cancellation of the signals which are repetitive from pulse to pulse and displaying the components which are not repetitive.

The arrangement just described results in a final signal output which may be variable in amount in both positive and negative directions with respect to a given datum level representing the no-signal condition. Such output is not well suited to indicator display systems in which the echo signal is used to effect modulation of the intensity of the C. R. T. beam instead of deflection and Figure 3 shows a modified arrangement of part of Figure 2 adapted to provide a uni-directional variation of output voltage with respect to the no-signal level.

In Figure 3, the delayed output from delay device 59 is passed through an inverter 61 before being fed, in parallel (or series) with the undelayed output from buffer stage 55 to a mixing stage 62. This stage will provide a two-directional output and this is fed to each of two diode rectifiers 63, 64 arranged in opposition whereby positive-going signals pass by way of diode 63 to a cathode followed or buffer stage 65 directly whereas negative-going signals pass by way of diode 64 to an inverter stage 66 before being supplied to the stage 65. All signals are thus converted to positive-going sense with respect to the chosen datum level and may be used to modulate the control grid 68 of the C. R. T. 67. Modulation at the cathode 69 by negative-going signals may be achieved by interchange of the position of the inverter stage.

Figure 4 shows one arrangement of apparatus for operation with the "coherent-pulse" technique of operation and using pre-demodulation comparison and cancellation. In this figure, 70 denotes a pulse transmitter of any suitable form, delivering pulses to an aerial 71, said pulses being rendered coherent in phase with one another by their derivation from a continuous reference oscillation provided by a local source 72 as described in co-pending application of Harry Grayson and Denis Edwin Brown, entitled Radio Location Systems (an application corresponding to British application 5,065/45), filed in the United States Patent Office August 5, 1947, Serial No. 766,309, equivalent of British patent specification No. 605,454.

A receiving aerial 73 supplies received signals to an R. F. amplifier 74 which in turn feeds a mixer stage 75. The latter is provided, in known manner, with a local source 76 of heterodyne oscillations to facilitate frequency conversion of the input signals for further amplification in the I. F. amplifier stages 77. The mixer stage 75 is also supplied with oscillations from the reference source 72 whereby any "Doppler-changed" received signals are provided with a "Doppler-beat" component in the I. F. stages 77.

The I. F. output from stages 77 is supplied to each of two buffer amplifier stages 78, 79, the stage 78 having its output fed directly to the final demodulator 82 whereas the stage 79 supplies its output to the same demodulation stage through a delay device 80 and an inverter stage 81. The overall delay imposed by units 80 and 81 is made equal to the pulse-recurrence period prp (Figure 1) whereby comparison is made in the demodulation stage 82 of an echo-signal supplied directly thereto through buffer stage 78 with an echo signal emanating from the same range or ranges but in response to the previous transmitted pulse and arriving by way of the delay device 80 and inverted in sense or polarity by the inverter stage 81. Subsequent to any necessary further amplification in stage 83 the resultant rectified output, which will contain only those signals which are non-repetitive such as those from objects possessing a radial velocity with respect to the receiver, may be applied to suitable indicating devices by way of leads 84 and 85.

In the arrangement of Figures 2, 3 and 4 the various units of the pulse transmitters and receivers may be of any suitable known form. Similarly the buffer and inverter stages may be of known type. The delay devices 59 or 80 may take the form of suitable electric networks, for example, of the so called "delay line" type shown in Figure 5 and comprising a ladder network of discrete series-connected inductive elements L and discrete shunt-connected capacitive elements C, and extending between input terminals In and output terminals Out. Alternatively, if the time-day required is greater than can conveniently be obtained thereby, use may be made of supersonic delay cells of known type. The use of such supersonic delay cells with post-detector comparison and cancellation arrangements as described in connection with Figures 2 and 3 will necessitate the superimposition of the signal-output from receiver 52 upon suitable (supersonic) frequency carrier oscillation for use with the delay cell followed by further demodulation if necessary. Figure 6 shows one such arrangement in which the signal output is applied to a mixer stage 90 which is supplied with a local oscillation from source 91. The output of the mixer stage is fed to a supersonic delay cell 92 of known form and consisting of a tube of suitable length filled with a suitable medium such as mercury or water with quartz crystal elements 93, 94 sealed at each end. The element 93, supplied from the mixer stage 90 operates as the supersonic wave transmitting member of the cell and the other element 94 as the wave receiving element. The reconverted and delayed signal output from this element is then fed to a further demodulator 95 and the output from the latter used to operate the subsequent comparison means. The frequency of the local oscillation source 91 should, of course, be equal to that of the supersonic frequency for which the cell 92 is designed. It is desirable to provide a fine phase adjusting device capable of effecting smooth variation of phase-angle over 360° in the delay branch circuit 79, 80, 81 of Figure 4 to achieve precise anti-phase timing of the two signals. It is also desirable to include suitable gain-adjusting means in one or both of the two circuits including the buffer stages 55, 56 or 78, 79 to balance out the different attenuation imposed by each branch.

It is not essential that the received signal which is to be compared with a subsequent signal should be delayed with the aid of a suitable delay cell or network having a fixed delay time. Alternatively methods such as the recording of the signal on a magnetic tape or photo-film may be employed by which storage of the received signals is effected until an appropriate time at which to effect the requisite comparison. Such comparison may be effected by direct application of the recorded version, e. g., by superimposed photo film images, and without re-conversion to the original pre-recording form of signal. Such storage methods have the advantage that a fixed pulse recurrence frequency is not necessary.

We claim:

1. A radar apparatus comprising a continuously operating source of high frequency electric oscillation of stable repetition rate, a transmitter for radiating pulses of electro-magnetic energy, means coupling said source to said transmitter to phase lock the carrier wave of each radiated pulse to said oscillation, a single receiver for receiving reflected pulses, means coupling said source directly to said receiver, delay means comprising a first channel connected to said single receiver for delaying each and every one of said received pulses by a time equal to the time between two consecutive transmitted pulses, means comprising a second channel coupled to said single receiver for passing each and every one of said received pulses without appreciable delay, and signal subtracting means connected to both said first and said second channels and receiving each of said delayed and undelayed pulses for subtracting the said delayed pulses from the undelayed received pulses whereby, in the said subtracting means, each received signal is compared with a signal which preceded it.

2. In radar apparatus for detecting moving objects, a radio-location receiver circuit, a pulse transmitter, a reference oscillator connected to both said transmitter and said receiver circuit, two buffer stages connected to said receiver circuit, a delay device connected to one of said buffer stages, an inverter connected to said delay device, a mixing stage connecting said inverter and the other buffer stage, two rectifying devices connected to said mixing stage, an inverter stage connected to one of said rectifying devices, a buffer stage connected to both said inverter stage and the other rectifying device, a cathode ray tube, the control grid of said tube being connected to said last named buffer stage and modulated thereby.

3. In radar apparatus for detecting objects having movement in a radial direction relative to the apparatus, a pulse transmitter, a reference oscillator providing a continuous high-frequency oscillation of stable frequency and connected to said transmitter to phase lock the carrier wave of each of the radiated pulse signals to said reference oscillation, a single radar receiver including a mixer stage, means supplying said reference oscillation to said mixer stage of said single receiver, a cathode ray tube having two pairs of deflecting plates, time base generating means connected to one pair of deflecting plates for providing a beam scanning motion synchronised in frequency with that of the radiated pulse signals, two buffer stages each connected to receive each and every signal output from said single receiver, means connecting one of said buffer stages to one of the other pair of deflecting plates of said cathode ray tube to pass each and every one of said signal outputs directly to the said one plate, a signal delay device connecting the other of said buffer stages to the other plate of said other pair of deflecting plates of said cathode ray tube to pass each and every one of said received signals with a predetermined delay to said other plate, said delay device having a delay time equal to an integral multiple of the time period between successive transmitted pulses from said pulse transmitter whereby only signals received from radially moving objects produce a signal deflection of the beam trace on said tube.

4. In radar apparatus for detecting moving objects, a continuously operating reference oscillation source providing a high frequency electric oscillation of stable frequency, a transmitter for radiating a pulse modulated carrier wave, means electrically coupling said reference oscillation source to said transmitter to phase lock the carrier wave of said pulse modulated carrier wave to said reference oscillation, a single receiver for receiving signals comprising reflections of said pulsed wave from objects in the field of view of said radar apparatus, said single receiver including a mixer stage coupled to said reference oscillation source, delay means coupled to said receiver and comprising a first channel passing each and every one of said received signals, said delay means being arranged to delay said received reflections an integral multiple of the time interval between consecutive pulses of the pulse modulated carrier wave, means comprising a second channel coupled to said receiver for passing each and every one of said received signals without appreciable delay, and comparison means coupled to both said first and second channels for comparing delayed signals and undelayed signals, the delayed and undelayed signals applied to said comparing means being at an intermediate frequency of lower value than that of said reference oscillation but higher than that of the ultimate demodulated signal frequency.

5. In radar apparatus for detecting moving objects, a continuously operating reference oscillation source providing a high-frequency electric oscillation of stable frequency, a transmitter for radiating a pulse modulated carrier wave, means electrically coupling said reference oscillation source to said transmitter to phase lock the carrier of each of the radiated pulses to said reference oscillation, a single receiver for receiving signals comprising reflections of said pulsed wave from objects in the field of view of said radar apparatus, signal delay means connected to receive each and every signal output of said single receiver as input thereto and arranged to delay the signals applied thereto by a time interval equal to an integral multiple of the time interval between consecutive pulses of the pulse modulated carrier wave from said transmitter, further means coupled to said single receiver and passing each and every signal output of said receiver without appreciable delay, and means connected to receive each and every output from said delay means and from said further means for comparing such delayed and undelayed signals from the same object in a subtractive sense whereby such signals cancel for stationary objects and yield a substantial resultant for objects which are moving in a direction which includes a radial component relative to the radar apparatus.

6. The combination set forth in claim 5, said delay means comprising an electric delay net work.

7. The combination set forth in claim 5, said delay means comprising a supersonic delay cell.

8. The combination set forth in claim 5, said combining means comprising a cathode ray tube having deflecting means to which the delayed and undelayed signals are applied in opposing senses.

9. The combination set forth in claim 5 in which said means for comparing delayed and undelayed signals includes a phase inverter for reversing the phase of one of said delayed and undelayed signals from said receiver.

10. The combination set forth in claim 9 including final demodulating means connected to receive the resultant output from said signal comparing means.

11. In radar apparatus for detecting moving objects, a continuously operating reference oscillation source providing a high frequency electric oscillation of stable frequency, a transmitter for radiating a pulse modulated carrier wave, means electrically coupling said reference oscillation source to said transmitter to phase lock the carrier wave of said pulse modulated carrier wave to said reference oscillation, a single receiver for receiving signals comprising reflections of said pulsed wave from objects in the field of view of said radar apparatus, delay means connected to said receiver and passing each and every received signal from said receiver, said delay means being arranged to delay said received reflections an integral multiple of the time interval between consecutive pulses of the pulse modulated carrier wave and means connected to said delay means and said receiver for combining each and every one of said delayed signals and each and every one of said undelayed signals reflected from the same object whereby said signals cancel for stationary objects and yield a substantial resultant for moving objects, and a cathode ray tube connected to said combining means and intensity modulated thereby.

12. In radar apparatus for detecting moving objects, a continuously operating reference oscillation source providing a high frequency electric oscillation of stable frequency, a transmitter for radiating a pulse modulated carrier wave, means electrically coupling said reference oscillation source to said transmitter to phase lock the carrier wave of said pulse modulated carrier wave to said reference oscillation, a single receiver for receiving signals comprising reflections of said pulsed wave from objects in the field of view of said radar apparatus, delay means connected to said receiver and arranged to delay each and every one of said received reflections an integral multiple of the time interval between consecutive pulses of the pulse modulated carrier wave and means connected to said delay means and said receiver for combining each and every delayed signal and each and every undelayed signal reflected from the same object whereby said signals cancel for stationary objects and yield a substantial resultant for moving objects, said combining means comprising a cathode ray tube arranged for the display of the resultant of the compared signals as intensity modulations thereof and having rectifier means for converting the modulating signals to unidirectional polarity.

13. In combination in radar apparatus for the detection of moving objects, a reference oscillation source providing a high-frequency electric oscillation of stable frequency, a transmitter for radiating a pulse modulated carrier wave, means electrically coupling said reference oscillation source to said transmitter to phase lock the carrier of each radiated pulse to said reference oscillation, a receiver for receiving signals comprising reflections of said pulsed wave from objects in the field of said radar apparatus, signal delay means connected to receive the output of said receiver as input thereto and arranged to delay the signals applied thereto by a time interval operatively related to the time interval between consecutive pulses of the pulse modulated wave carrier wave from said transmitter, and combining means connected to the output from said delay means and to an undelayed output from said receiver for comparing such delayed and undelayed signals from the same object in opposition to each other with negative feed back whereby such signals cancel for stationary objects and yield a single difference-indicating signal representative of objects which are moving in a direction having a radial component relative to the radar apparatus, and indicating means connected to said combining means and responsive to the said single difference-indicating signal produced thereby.

14. In radar apparatus for detecting moving objects, a radio location receiver circuit, a pulse transmitter, a reference oscillator connected to both said transmitter and said receiver circuit, a signal output terminal in said receiver circuit, a first signal transfer channel connected to said signal output terminal, a second signal transfer channel including delaying means and phase shifting means also connected to said signal output terminal, said delaying means imposing a time delay, relative to the transmission of signals through said first channel, equal to an integral multiple of the time interval between successive pulses from said pulse transmitter and said phase shifting means causing phase-inversion of signals at the output end of said second channel relative to signals at the output end of said first channel, and mixer-rectifier means supplied with the outputs from said first and second signal transfer channels, said mixer-rectifier means operating to compare the received signals through said two signal transfer channels in a subtractive sense to provide a single output signal representative of the instantaneous differences between said two input signals through said two signal transfer channels, and indicator means for receiving said difference-indicating output signal.

References Cited in the file of this patent

UNITED STATES PATENTS

| | | |
|---|---|---|
| 2,226,459 | Bingley | Dec. 24, 1940 |
| 2,406,316 | Blumlein et al. | Aug. 27, 1946 |
| 2,407,000 | Evans | Sept. 3, 1946 |
| 2,408,742 | Eaton | Oct. 8, 1946 |
| 2,410,424 | Brown | Nov. 5, 1946 |
| 2,422,135 | Sanders | June 10, 1947 |
| 2,437,173 | Rutherford | Mar. 2, 1948 |
| 2,467,361 | Blewett | Apr. 12, 1949 |
| 2,480,038 | Mason | Aug. 23, 1949 |
| 2,487,995 | Tucker | Nov. 15, 1949 |
| 2,491,450 | Holmes | Dec. 13, 1949 |
| 2,523,283 | Dickson | Sept. 26, 1950 |
| 2,532,546 | Forbes | Dec. 5, 1950 |
| 2,535,274 | Dicke | Dec. 26, 1950 |
| 2,570,203 | Busignies | Oct. 9, 1951 |